March 28, 1961  J. M. WILSON, SR  2,976,617
PIPE FLANGE GAUGE
Filed July 14, 1958

James M. Wilson, Sr.,
INVENTOR.

BY Loyal J. Miller
ATTORNEY

United States Patent Office 2,976,617
Patented Mar. 28, 1961

2,976,617

PIPE FLANGE GAUGE

James M. Wilson, Sr., 1503 NW. 8th, Oklahoma City, Okla.

Filed July 14, 1958, Ser. No. 748,279

2 Claims. (Cl. 33—199)

The present invention relates to measuring devices and has reference more particularly to pipe flange and thread diameter gauges.

It is often difficult to obtain exact measurements of the root diameter of standard or V-shaped internal threads of the flanges of large diameter pipes. Such difficulty is occasioned not only by the large diameter of the pipe, but that calipers sufficiently large are not always available, and by the fact that unless the tip ends of the calipers are ground to points, they will not contact the root of the threads. Additionally the calipers, when once properly set in measuring the root diameter, must be moved from this position in order to withdraw the calipers from the thread end of the pipe. Thereafter the calipers thread measuring position must be duplicated in order to measure the distance between the tip ends of the calipers. It is, therefore, quite easy for the workman to mismeasure or miscalculate the desired crest diameter of the mating or male threads being formed for connection with a particular flange.

It is, therefore, the principal object of the present invention to provide an inside diameter or pipe flange thread gauge.

A further object is to provide a device of this class which may be inserted into the threaded end of a pipe flange and adjustably lengthened to contact opposing walls of the flange.

An additional object is to provide a device of this class having oppositely directed contact members carried by a body member and mandrel hingedly connected intermediate its ends, whereby the device may be folded for removal from within the threads of a pipe flange.

Still another object is to provide a device of this character which will accurately represent the root diameter of V-shaped threads measured both before and after its removal from a pipe flange.

The present invention accomplishes these and other objects by providing an elongated body member having an axial bore in each of its ends. Oppositely directed contact members are adjustably carried by the bores in the body. One of the mandrels or contact members is hingedly connected together intermediate its ends. The free ends of the contact members are conical shaped for seating on the root diameter of V-shaped threads.

Other objects will be apparent from the following description when taken in conjunction with the accompanying single sheet of drawings, wherein.

Like characters of reference designate like parts in those figures of the drawings in which they occur.

In the drawings.

Figure 1:
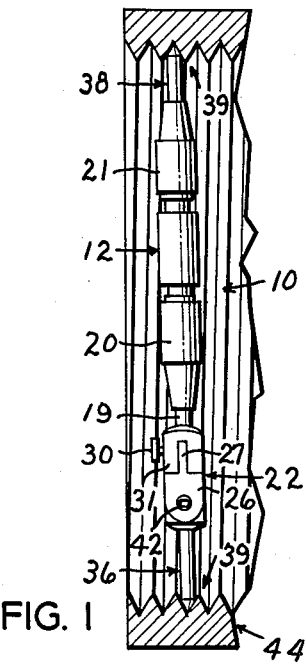
Figure 1 is a fragmentary cross-sectional view of a pipe flange illustrating the device in elevation positioned therein.
Figure 3:
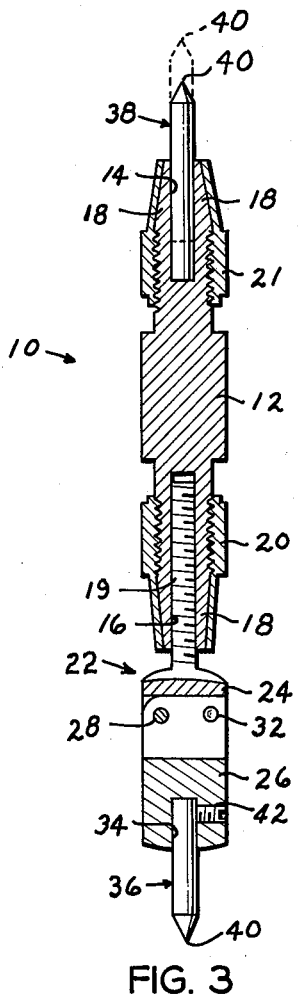

The reference numeral 10 indicates the device, as a whole, comprising an elongated substantially cylindrical body member 12 having axial bores 14 and 16 in its respective ends. The periphery of each free end portion of the body 12 tapers toward its free end and is transversely slotted or divided to form a plurality of drill chuck segments, as at 18, which are surrounded by a pair of collets 20 and 21 threadedly secured to the body. The periphery of the body 12, between the collets 20 and 21, and the peripheries of the collets may be provided with knurling, not shown, for ease in manually releasing or tightening the collets for the purposes which will presently be apparent. The diameter and length of the body member are not critical and may be varied as desired. I have found that a diameter of approximately five-eighths of an inch and a length of approximately three inches are quite satisfactory.

The bore 16 is internally threaded for co-operatively receiving the threaded end 19 of a mandrel 22. The mandrel 22 includes a substantially square head end which is formed of two parts 24 and 26. The mandrel head portion 24 is bifurcated to interdigitately receive a lip portion 27 of the mandrel end or block 26. A hinge pin 28 extends transversely through the bifurcated end of the head 24 and the portion 27 of the mandrel end 26 therebetween in offset relation with respect to the center of the head end 22. A thumb screw 30 threadedly engaged within one leg 31 of the bifurcated end contacts a conical recess 32 in the hinged end portion 27 for locking the latter in aligned thread measuring position. The free end of the hinged end 26 is provided with a bore 34 axially aligned with the bores 14 and 16 for receiving a cylindrical contact member 36. A similar contact member 38 is received by the body bore 14. Thus, the contact members 36 and 38 are axially aligned and extend in opposite directions. The free end of each of the contact members 36 and 38 is formed on a taper of 60° included angle to form a conical shaped end so that each conical shaped end may be complementally received between standard V-shaped threads, as at 39, thus permitting the tip or point 40 of the conical shape of the respective contact members to contact the bottom or root diameter of such threads. The contact member 36 is rigidly positioned within the hinged end 26 by a setscrew 42 while the contact member 38 is preferably adjustably positioned within the bore 14 and held in such adjusted position by manually tightening the drill chuck collet 21.

*Operation*

Figure 2:
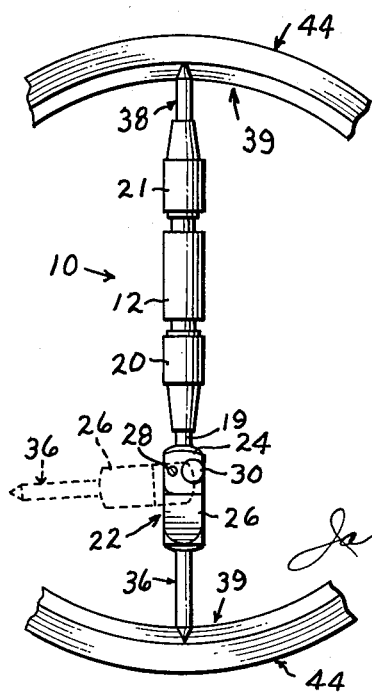
Figure 2 is an elevational view of the device, rotated substantially 90° from the position shown in Fig. 1, contacting a fragmentary pipe flange end and illustrating in dotted lines, the action of the hinged member; and, Figure 3 is a vertical cross-sectional view of the device as seen in the position of Fig. 2.

In operation the device 10 is assembled as described hereinabove. It is to be noted that a plurality of contact members 38 is provided each having a different length and preferably graduating in two inch increments from approximately three and one-half inches long to approximately forty-five and one-half inches. Thus, when the threads of a particular pipe flange 44 are to be measured the contact member 38 is selected which will, when connected with the device 10, approximate the diameter of the pipe flange. The device is inserted into the pipe flange 44 at least three full threads from the free end thereof and lengthened or extended so that the tips 40 will diametrically contact the opposing threaded walls of the flange by manually rotating the mandrel head 22 relative to the body 12, or vice versa. When the contact members' tip ends 40 are accurately contacting the root diameter of the threads 39 the drill chuck collet 20 is manually tightened to secure the mandrel end 19 against rotation relative to the body 12. The device is removed from within the threaded end of the pipe flange by loosening the thumb screw 30 and pivoting the mandrel end 26 on the hinge pin 28 as shown by the dotted lines (Fig. 2). After removing the device from the pipe flange the mandrel end 26 is repositioned to align the contact member 36 with the contact member 38 and the thumb screw manually tightened again. Since the inner end of the thumb screw is received within the conical recess 32 the tip ends 40 accurately represent the measured root diameter of the threads after the removal of the device from the pipe flange. Thereafter the distance between the tip ends may be measured with any selected scale or measuring device for obtaining the crest diameter of V-shaped threads to be formed on a mating part.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A pipe flange and thread gauge, comprising: an elongated body having aligned bores in its respective ends, the respective ends of said body being transversely slotted, one end of said body having internal threads in the bore thereof; a collet threadedly engaged with each said slotted end, respectively; a first rod-like contact member carried by the end of said body opposite the internally threaded end, said first contact member having a conical free end portion; a mandrel threadedly engaged with the threaded bore of said body, said mandrel having an enlarged, substantially square, free head end portion; a substantially square block contacting the outwardly directed end of said head end portion to form a continuation thereof; a hinge pin transversely connecting said block with said head end portion for lateral pivoting movement of said block with respect to the axis of said body, said hinge pin being positioned in lateral offset relation with respect to the axis of said body, said block having a central bore in its free end in axial alignment with respect to the bores in said body; a thumb screw threadedly carried transversely by said head end portion and removably engageable with said block for fixedly positioning the latter in aligned relation with respect to said head end portion; a second rod-like contact member carried by the bore in said block, said second contact member having a conical free end portion; a transverse setscrew threadedly carried by said block in contact with said second contact member for securing the latter.

2. A pipe flange and thread gauge, comprising: an elongated body having aligned bores in its respective ends, the respective ends of said body being transversely slotted, one end of said body having internal threads in its bore; a collet threadedly engaged with each said slotted end, respectively; a first rod-like contact member carried by the end of said body opposite the internally threaded end, said first contact member having a conical free end portion; a mandrel threadedly engaged with the threaded bore of said body, said mandrel having an enlarged, substantially square, bifurcated free head end portion, substantially square block forming a continuation of said head end portion, said block having a lip end portion interdigitately received by said head end portion; a hinge pin transversely connecting said lip end portion with said head end portion, said hinge pin being positioned in lateral offset relation with respect to the axis of said body, said block having a central bore in its free end in axial alignment with respect to the bores in said body; a thumb screw threadedly carried transversely by one side of the bifurcated end of said head end portion for releasably contacting one side surface of said lip end portion; a second rod-like contact member carried by the bore in said block, said second contact member having a conical free end portion; a transverse setscrew threadedly carried by said block in contact with said second contact member for securing the latter.

References Cited in the file of this patent

UNITED STATES PATENTS

| | | |
|---|---|---|
| 129,536 | Cross | July 16, 1872 |
| 762,971 | Woerner | June 21, 1904 |
| 809,191 | La Duke et al. | Jan. 2, 1906 |
| 1,289,985 | Wells et al. | Dec. 31, 1918 |

OTHER REFERENCES

Publ., Amer. Mach., June 26, 1950, page 112.